United States Patent [19]

Altena

[11] 4,443,750
[45] Apr. 17, 1984

[54] ENERGY SAVING MOTOR SPEED CONTROLLER

[75] Inventor: Edgar Altena, Trumbull, Conn.

[73] Assignee: Zero-Max Industries, Incorporated, Minneapolis, Minn.

[21] Appl. No.: 145,244

[22] Filed: Apr. 30, 1980

[51] Int. Cl.³ .............................................. H02P 5/40
[52] U.S. Cl. .................................... 318/808; 318/803
[58] Field of Search ............... 318/801, 803, 805, 810, 318/811, 808, 798, 806

[56] References Cited

U.S. PATENT DOCUMENTS

| | | | |
|---|---|---|---|
| 3,515,971 | 6/1970 | Joslyn et al. | 318/308 |
| 3,748,556 | 7/1973 | Gillett | 318/808 |
| 3,860,858 | 1/1975 | Nola | 318/801 |
| 3,983,463 | 9/1976 | Nabae et al. | 318/803 |
| 4,158,163 | 6/1979 | Eriksen | 318/798 |

OTHER PUBLICATIONS

Phillips, K. P. "Current-Source Converter for AC Motor Drives" Transactions on Industry Applications, IA-8, No. 6 Nov./Dec. 1972.
Elsenhaure et al. "A High Efficiency Controlled Slip Induction Motor Drive for Electric Vehicles," Proceedings of the 14th Intersociety Energy Conversing Engineering Conference, Boston, MA., Aug. 5-10, 1977.

Primary Examiner—David Smith, Jr.
Attorney, Agent, or Firm—Milton E. Gilbert; Gary E. Ross

[57] ABSTRACT

A variable speed motor controller for an AC motor, said controller including a DC to AC converter for providing adjustable frequency AC signals to vary the speed of said motor, and a sensing device and energy saving control for detecting the magnitude of the current signal being supplied to the motor and adjusting the AC voltage to the motor depending upon the magnitude of the current signal. The smaller the motor current being sensed, the smaller the voltage applied to the motor, thereby effecting a saving of energy. Energy is saved using this controller because when the lesser motor current indicates that it is driving less than full load, the input voltage applied to the motor is reduced thereby effecting a power saving.

11 Claims, 10 Drawing Figures

MOTOR WINDING SIGNALS

ENERGY SAVING MOTOR SPEED CONTROLLER

BACKGROUND OF THE INVENTION

1. Field of the Invention

This invention relates to improvements in variable speed motor controllers for a 3∅ AC motor and more particularly to improvements for reducing the amount of energy expended to produce the desired speed and output torque of the motor at less than full load conditions over at least a portion of the speed range controlled by the controller.

2. Description of the Prior Art

Variable speed motor controllers of the type shown herein for 3∅ AC motors without the improvement of this invention have been produced for many years. Some of these variable speed motor controllers are sold by the assignee of this invention, and include a converter circuitry for deriving three phase AC voltages from a DC power source to drive the 3∅ AC motor windings. The frequency of the AC voltage is varied by a speed control to set the speed of the motor, and the magnitude of the AC voltage is also adjusted by the speed control to provide the current required by the motor to produce the desired torque. In these systems the AC voltage applied to the motor is increased by the speed control substantially linearly with speed. Thus under light loads, excess voltage is being provided to the motor which results in energy being wasted.

While this was at one time not a significant problem, the higher costs of electrical energy have necessitated that energy be saved whenever possible.

Since a large number of 3∅ AC motors are often operated at less than full load, it is desired to provide an inexpensive system to effect a reduction in excess motor voltage when the motor is operating at less than full load.

SUMMARY OF THE INVENTION

The present invention concerns a motor speed controller for generating adjustable frequency AC signals for operating 3∅ AC motors at different speeds, in accordance with the setting of a speed command. For saving energy, a feedback control signal is derived from the DC current drawn by the motor and this feedback signal is employed to control the level of amplitude of output voltage supplied to the motor by the controller. The magnitude of the DC current feedback is related to the amount of load being driven by the motor and therefore the motor voltage, and energy applied to the motor is reduced as determined by the needs of the load.

At light loads, the load current drawn by the motor is decreased, indicating that full output voltage from the converter is unnecessary to drive the motor at this light load at the speed selected. The detection of the decreased current permits the AC output voltage applied to the motor to be decreased whereby the selected speed and torque are produced by a smaller voltage, and lower power, than would be necessary to operate the motor under full load at a particular speed. In this manner it is possible to reduce power usage for 3∅ AC motors operating at various loads that are less than full load.

DETAILED DESCRIPTION OF THE INVENTION

Figures 1, 2:
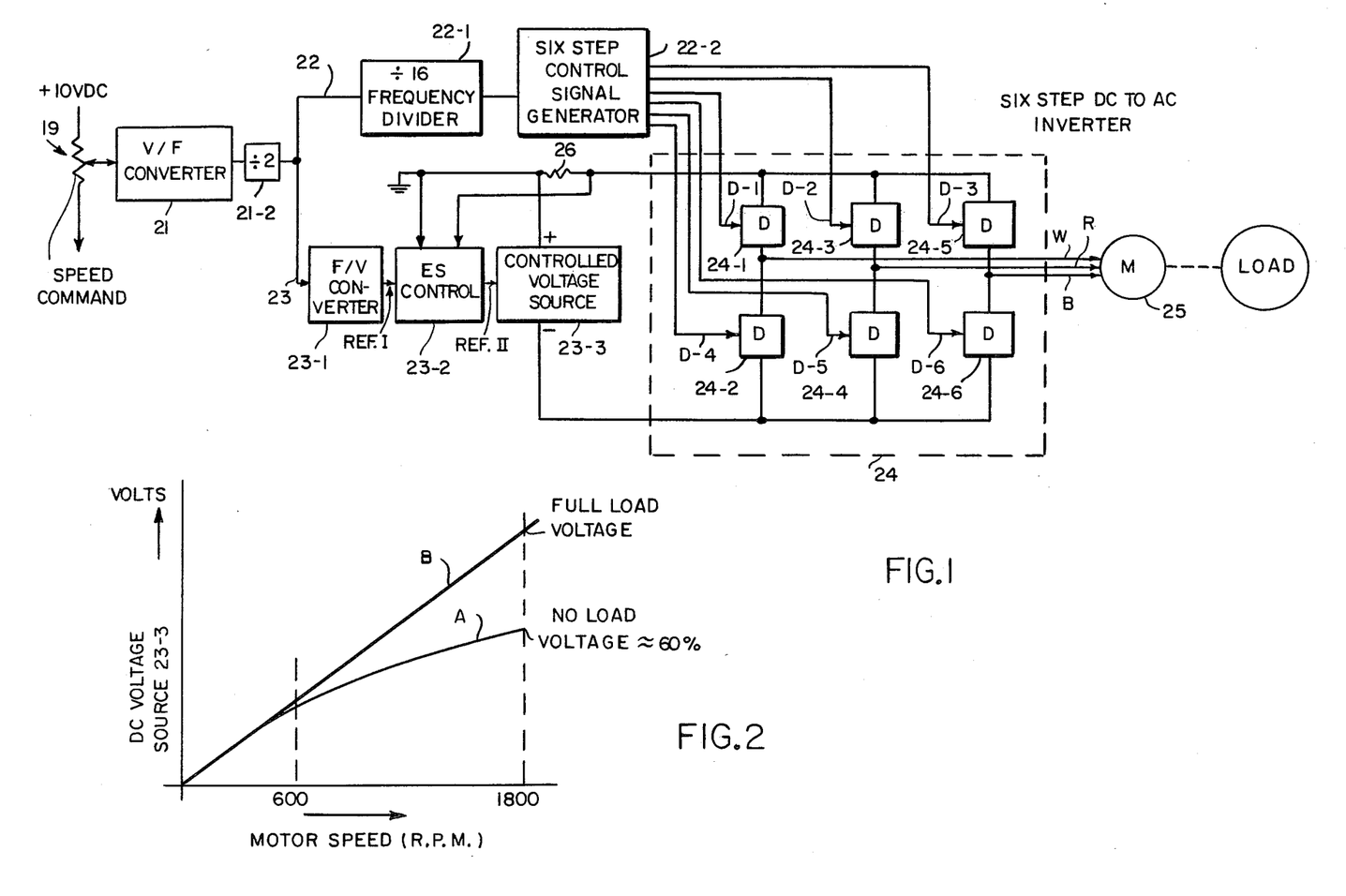
FIG. 1 is a block diagram of a preferred embodiment of the present invention in use to drive a 3∅ AC motor.
FIG. 2 is a diagram illustrating the amplitude of voltage applied to the motor at different speeds, with curve "A" showing the voltage level with no motor load, and curve "B" showing the various voltage levels at different speeds when the motor is fully loaded.
Figure 6:
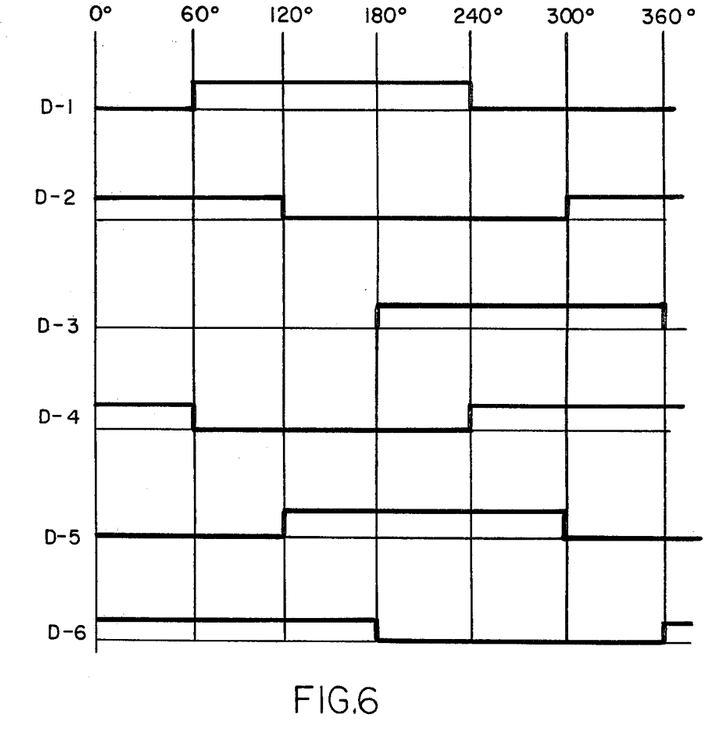
FIG. 6 is a diagram illustrating the approximate shape of, and the timing relationship between the control signals D-1 to D-6.

Referring to FIG. 1, the speed of the motor is controlled by adjustment of a potentiometer 19, and the adjusted DC voltage is applied to a voltage frequency converter circuit 21 that generates an AC signal whose frequency is linearly proportional to the selected DC voltage. This adjustable frequency signal is initially reduced in frequency by a factor of 2 by a frequency divider circuit 21-2, and the reduced frequency signal is then applied over two channels. In the upper channel 22, the frequency of this signal is further greatly reduced by a factor of 16, by a frequency divider circuit 22-1, and this much lower frequency AC signal is then applied to a six step control signal generator 22-2 that produces six phase displaced control signals at the lower AC frequency as is shown in the diagram of FIG. 6. These six fixed phase displaced control signals are applied to the six power switches of driver module 24 that applies AC power to the three phase windings of motor 25.

In the lower channel 23, the AC signal from frequency divider 21-2 is applied to a frequency-to-voltage converter 23-1 to produce a variable level DC signal for controlling the level of voltage to be applied to the motor 25. In the absence of an energy saving circuit, to be described below, the voltage level of the AC pulses to be applied to the motor 25 would normally be increased in a linear manner in response to the circuit 23-1 as the speed of the motor is increased, as is shown by curve "B" in FIG. 2. However, according to the present invention, this variable DC signal from 23-1 is applied to an "energy saving" control circuit 23-2, that responds to a feedback signal across resistor 26 that is proportional to the current drawn by the motor 25. This feedback signal adjusts the DC voltage to a different level, as shown by curve "A" of FIG. 2, in proportion to the load being driven by the motor 25. Thus, where the motor 25 is driving a full load, the output current drawn by the motor from the circuit is at the rated full load condition and the large current feedback to the energy saving circuit results in the voltage applied to the motor being linearly increased at each speed as shown by linear curve "B" in FIG. 2. However, where the motor is "unloaded", the current drawn by the motor is less at each different speed than for full load, and the lower feedback voltage applied to the energy saving control circuit 23-2 at each speed accordingly reduces the voltage applied to the motor to follow the no-load voltage curve "A" of FIG. 2. It will be appreciated that at any intermediate level of motor loading, the current drawn by the motor will be less than that at full load yet greater than that at no-load. Accordingly, the feedback signal across resistor 26 will reflect the magnitude of the loading at each speed and it will, in turn, control the level or amplitude of the voltage to be applied to the three phase AC motor 25 [at the frequency produced at the output of frequency divider 22-1] by adjusting it to that necessary for that combination of load and speed but not in excess thereof.

It will therefore be appreciated that the function of the energy saving circuit 23-2 is to reduce the level or magnitude of the AC voltage applied to the motor to only that required for each different combination of speed and load, such that the motor produces sufficient torque without loss of speed or stalling. Yet the energy applied to the motor [combination of voltage and current] is minimized to improve the efficiency of the system. Where the load is decreased at any given speed both the current and AC voltage to the motor are both decreased, whereas the frequency remains constant to drive the motor at that given speed. Conversely, where the load is increased at any given speed, the motor draws more current for the greater load and the voltage is also accordingly increased as a result of the feedback to the energy control circuit 23-2.

Since different types and ratings of motors will have different current-load-voltage characteristics, the energy saving curcuitry of the present invention can be designed to provide optimum efficiency for any given type and rating of motor, or it can be designed to provide less than optimum improved efficiency for an entire class or group of different motors. For custom use with only a particular motor, the energy saving circuit 23-2 can be designed to provide the minimum level of voltage for each different load-speed combination that will drive the motor without precipitous loss of speed. On the other hand, to provide a more "universal" motor control system that is usable with a variety of different motors, the system is less optimized to reduce the voltage level to a lesser extent, to that sufficient to drive each of such variety of different motors at the various load-speed combinations.

In one example, using a 2 HP Baldor three-phase motor, rated at 460 volts and 3.2 amperes, the lower curve "A" in FIG. 2 shows the variation in voltage applied to this three phase AC motor by the circuit at speeds ranging from below 600 R.P.M. to about 1800 R.P.M., when the motor is driven without load. (These voltages shall be used throughout the specification by way of example.) The upper curve "B" shows the higher level and linear increase in voltage applied to this same motor by the circuit over the same range of speeds when the motor is fully loaded. With the energy saving system of FIG. 1, and employing the circuit implementation shown in FIGS. 3, 5, and 7 to 10, inclusive [to be described], it was found that the no-load voltage to the motor at the speed of 1800 R.P.M. could be reduced about 40% to about 360 volts from its normal full load voltage of 594 volts at the same speed, with the attendant improvement in energy efficiency.

Returning to FIG. 1, the adjustable voltage signal produced by the energy saving control circuit 23-2 is applied to control the level of DC voltage produced by the controlled voltage source 23-3, and as is described below. This DC level corresponds to the amplitude of AC pulses applied to the motor 25.

Figure 3:
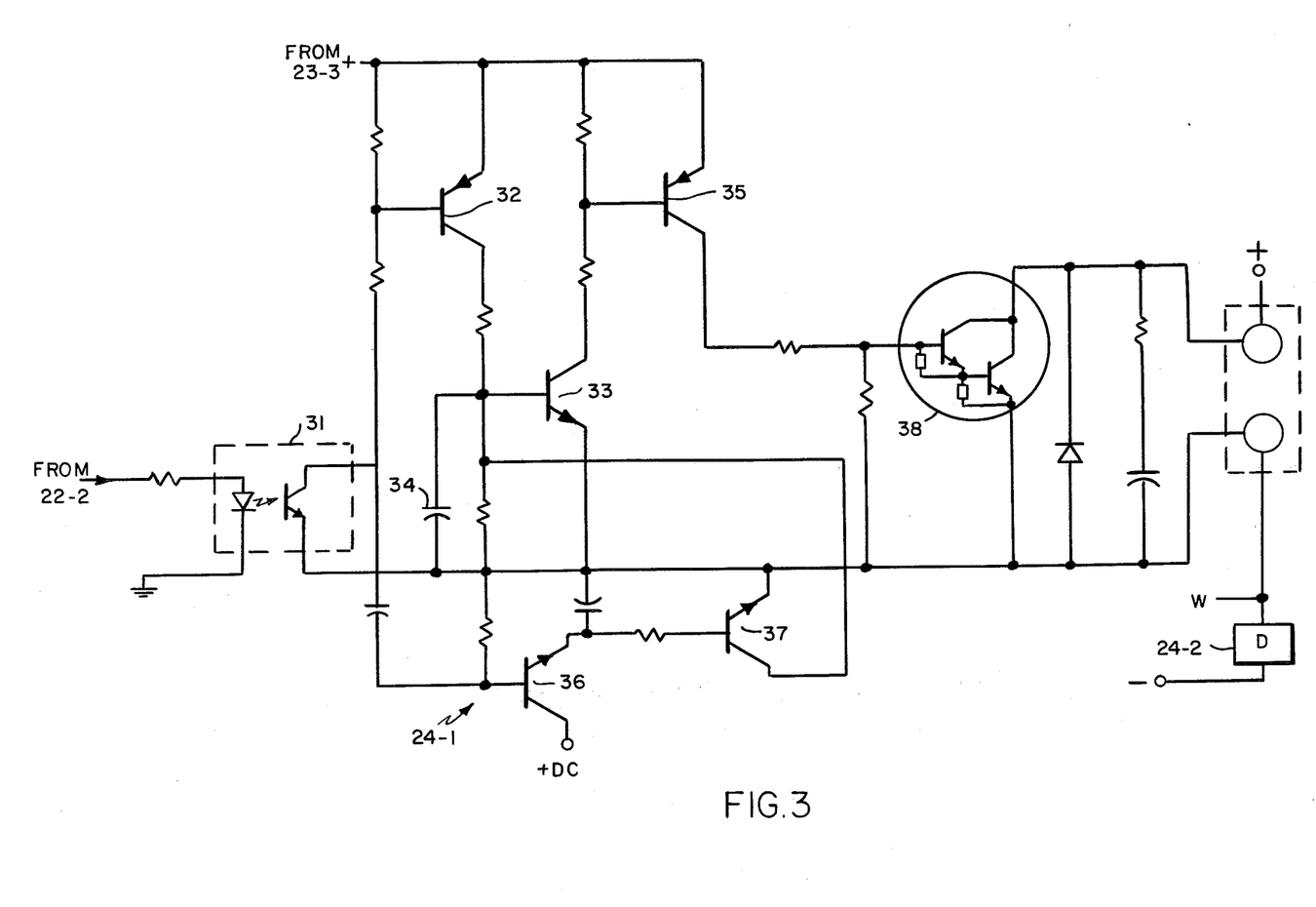
FIG. 3 is a schematic diagram showing one of the six driver's 24-1 to 24-6 of the AC-DC converter circuit 24.

Referring now to FIG. 3, there is shown a preferred switching circuit, such as circuit 24-1 in FIG. 1, for energizing the input line W of a there phase motor with the AC pulses. It will be appreciated that six such identical circuits are employed in the system of FIG. 1, shown as blocks 24-1 to 24-6, inclusive. Each of these six power switching circuits is driven by a different phase of the six pulsing outputs of the six step control signal generator 22-2. Each of these six power switching circuits is also energized by the adjustable level of the DC voltage from the controlled voltage source 23-3 which, in turn, is adjusted to the level or magnitude set by the energy saving circuit 23-2. Accordingly, each of these six switching circuits is closed and opened at a frequency corresponding to the speed desired, to apply an adjustable level voltage to the motor 25 that is determined by the energy saving circuit.

Referring to FIG. 3, the switching signal from the control signal generator 22-2 is initially applied to an optical isolator circuit 31 employing an LED and a photodiode to electrically isolate the switching circuit 24-1 from feeding back a signal to the control signal generator 22-2 yet transmitting triggering signals from the signal generator 22-2 to the switching circuit 24-1. A received trigger signal energizes transistor 32 into conduction to charge a time delay capacitor 34. After a delay of about 200 microseconds, the transistor 33 is made conducting by the charged capacitor and, in turn, energizes transistor 35 to conduct and supply base drive to the power Darlington circuit package 38. The Darlington circuit 38 is connected in series circuit between the adjustable controlled voltage source 23-3 and one of the three phase lines W energizing the motor 25. Accordingly, as the Darlington circuit 38 is repeatedly switched into conduction at the selected frequency by the signal from control signal generator 22-2, it applies the controlled voltage source 23-3 (controlled by the energy saving circuit 23-3) to the motor winding W. When the triggering signal from the control signal generator 22-2 is withdrawn, the transistor 32 is made non-conducting and the transistors 36 and 37 are rendered conducting to discharge the time delay capacitor 34. This renders the transistor 33 also non-conducting to, in turn, successively extinguish conduction in transistors 35 and the Darlington circuit 38, thereby to terminate current flow to the motor over line W and reset this switching circuit for the next trigger pulse.

To provide AC energization of motor winding W of this three phase motor 25, this winding W is also coupled to an identical electronic switch 24-2, as shown in FIGS. 1 and 3. The switch 24-2 is triggered into operation by the control signal generator 22-2 at the appropriate time or phase of each cycle, and when conducting it directs an oppositely flowing DC current to that winding W of the motor. As shown in FIG. 1, the electronic switches 24-1 and 24-2 are both connected to opposite polarities of the DC controlled voltage source 23-3 and therefore apply this "energy saving" voltage level to the motor winding in opposite polarities or directions.

Referring to FIG. 6, it is observed that the waveform D-1 showing the signal applied to switch 24-1, actuates switch 24-1 from a phase of 60° to 240° in the cycle, whereas the waveform D-4 showing the signal applied to switch 24-2, actuates the switch 24-2 from 0° to 60° and from 240° to 360° during each AC cycle. Thus whenever switch 24-1 is turned on to pulse the motor winding W, the other switch 24-2 is turned off whereas when switch 24-2 is on, the switch 24-1 is off.

Figures 9, 11:
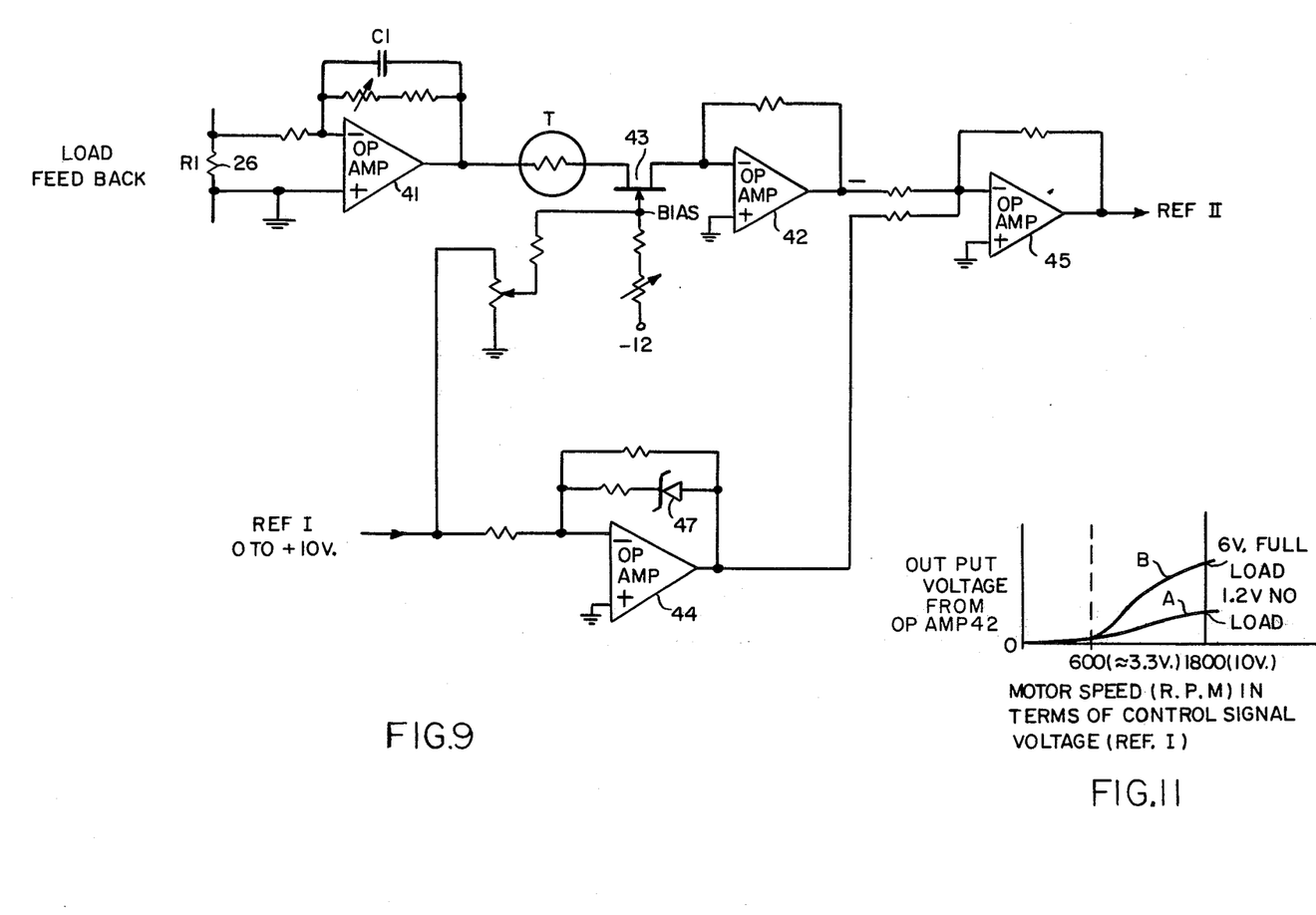
FIG. 9 is a diagram illustrating a preferred energy saving control circuit, according to the invention.
FIG. 11 is a diagram showing the variation in the output from OP AMP 42 of FIG. 9 over the range of different speeds; with curve "A" showing the variation when the motor is not loaded, and curve "B" when the motor is fully loaded.

FIG. 9 illustrates details of a preferred energy saving circuit 23-2. As shown in FIG. 1 and FIG. 9, a feedback signal proportional to the motor load current is directed through resistor 26, and this "load" signal is directed to an integrating operational amplifier 41 that amplifies and integrates this load signal. In a preferred embodiment, the output of amplifier 41 varies form about 0.2 Volts to 1.0 Volts when the motor load varies from no load to full load conditions at a given speed.

This "load" or feedback signal is applied to a field effect transistor 43 and operational amplifier 42 that together function as a variable gain amplifier. When the field effect transistor 43 is biased off or at very high resistance, the gain of this circuit is zero or very low and the load feedback signal is effectively disconnected from the circuit or contributes little to the circuit. On the other hand, when the resistance of the FET 43 is progressively decreased, the gain of Op. amp. 42 is increased and a proportionately greater quantity of the load feedback signal is applied. The degree of conduction of FET 43 is controlled by the "speed" signal obtained over REF I line, and applied to the base of FET 43 whereby, as the speed is increased, a greater proportion of the load signal is applied to the remainder of the circuit, as discussed below.

The speed signal over REF I line is also applied to an operational amplifier 44, and the output of operational amplifier 44 [speed signal] is combined with the output of operational amplifier 42 [load signal] and applied to a combining operational amplifier 45. This combination of the speed signal and load feedback signal determines the voltage level of REF II, which, in turn, determines the level or amplitude of the AC voltage pulses applied to the motor.

In a preferred embodiment, it is desired that at speeds below 600 RPM, the circuit not respond to the load feedback signal but only to the speed signal. This is performed by the functioning of the FET 43 and OP amplifier 42. At low speeds [below 600 RPM], the small speed signal biases the FET 43 to a high-resistance, substantially non-conducting condition whereby the gain of the combined FET 43-operational amplifier 42 is substantially zero. However, as the speed of the motor is increased above 600 RPM, the speed signal progressively increases the gain of the FET 43 and OP amp. 42 combination, to apply proportionately greater amounts of the load feedback signal to the circuit to "boost" the motor voltage.

In addition to controlling the gain of amplifier 42 above 600 RPM, the gain of the lower OP amp. 44 (the Op. Amp. that transmits the speed signal) is also different at speeds above and below 600 RPM. When the speed signal REF I has increased to that representing a speed of about 600 RPM, the output of amplifier 44 is large enough to cause the zener diode 47 to begin to conduct, creating an additional feedback path for the OP amp. 44 and reducing its subsequent gain [for higher speed signals] to about a unity gain.

Thus, at speeds below 600 RPM, the output voltage applied to the motor is progressively increased at a first controlled rate in proportion to the desired set speed of the motor [speed signal], without any load feedback signal affecting the circuit. However, as the speed signal is adjusted to and above 600 RPM, the increased speed signal progressively couples a greater proportion of the load feedback signal into the circuit to be combined with the speed signal and concurrently reduces the gain of the speed signal operational amplifier 44 to a unity gain to further diminish the effect of the feedback load signal and increase the effect of the speed signal.

Thus, at about 600 RPM low motor speed, the FET 43 starts conducting and feeds a signal into OP amp. 42. The gain of OP amp. 42 is, however, at a low level and but a small proportion of the load feedback signal is applied over the circuit as the motor is loaded from a no load to a full load condition. The frequency and voltage applied to the motor are primarily those "set" by the speed control. However, at the higher speed of 1800 RPM, the gain of the FET 43-OP amp. 42 combination is high and the increase in motor voltage with load increase is high. These conditions are illustrated by curves A and B of FIG. 11, that are similar to the curves A and B of FIG. 1. As shown by curve B, the energy saving circuit responds to the increased load current drawn by the motor at each speed between about 600 RPM to 1800 RPM to increase the voltage level or amplitude of voltage applied to the motor. On the other hand, as the motor draws less load current at each speed when unloaded, the energy saving circuit reduces the level of voltage applied to the motor.

Figure 4:
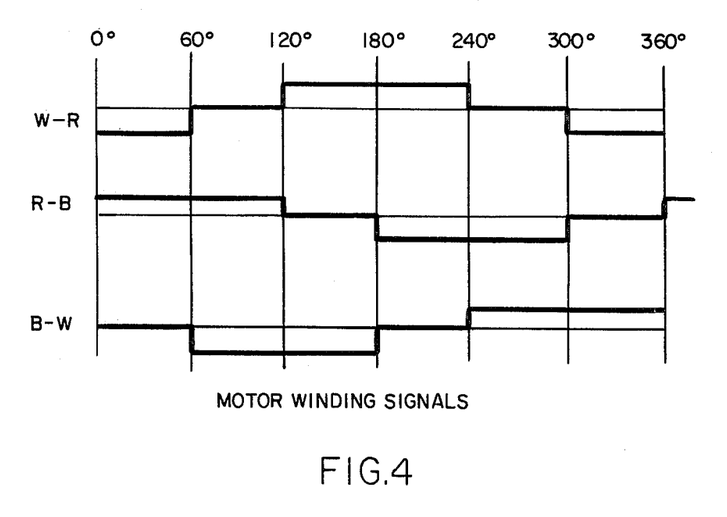
FIG. 4 is a waveform diagram generally illustrating the AC voltage applied between the pairs of windings W (white) to R (red); R to B (black), and B to W.

FIG. 4 illustrates the input waveforms from the drivers to the motor windings taken between the motor winding wires W, R and B.

Figure 5:
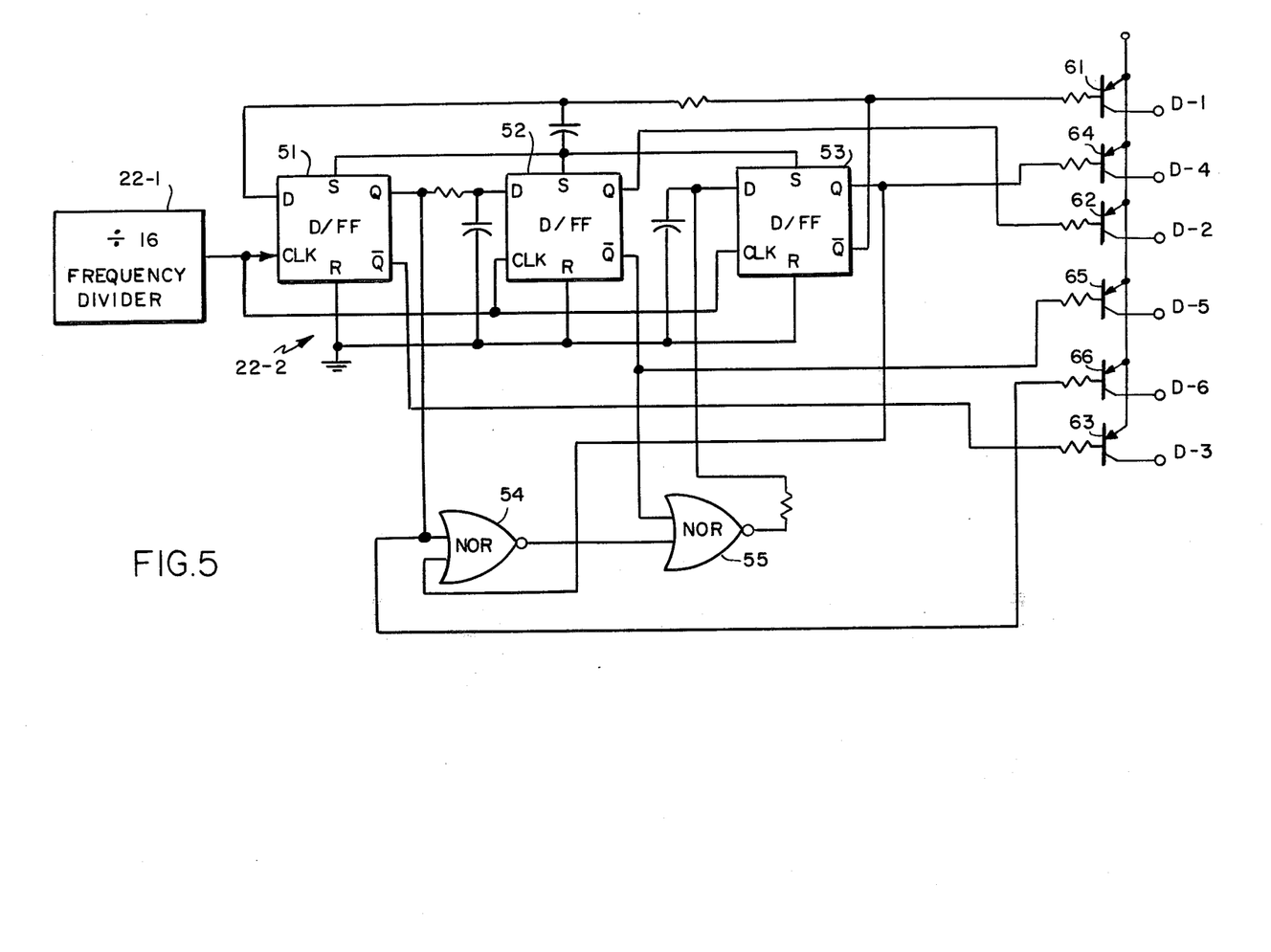
FIG. 5 is a block diagram of a preferred circuit for developing six phase displaced control signals D-1 to D-6, which are applied to the converter drivers to control the generation of the three phase AC.

FIG. 5 illustrates a conventional Divide-By-Sixteen circuit 22-1 for use with this invention, and shows the control signal generator 22-2 fed by this frequency divide circuit 22-1. The circuit of FIG. 5 receive the pulsed output of divider 22-1 and produces six phase displaced output signals D-1 to D-6 for the respective drivers 24-1 to 24-6 as shown in FIG. 1. In FIG. 5, pulses are applied from 22-1 to three Data Flip Flops 51, 52 and 53. The Data Flip Flops are coupled to NOR circuits 54 and 55 as shown in order to provide signals to the Data input of FF 53 at a proper time depending on the state of various outputs of Flip Flops 51, 52 and 53. The output signals generated from Flip Flops 51, 52 and 53 at the different times in each cycle are used to control the output transistors 61 to 66 to generate the signals D-1 to D-6 at the different times or phases as shown in FIG. 6.

Initially assume that all Q outputs of the Flip Flops 51 to 53 are low, that transistor 61 is off, that the input D of FF 51 is high (+DC), that transistors 52 and 53 are off, and that transistors 64, 65 and 66 are on. The first clock pulse from divider 22-1 is applied to FF 51, and causes FF 51 to toggle causing Q thereof to go low which in turn turns off transistor 66 and turns on transistor 63. The second clock pulse from 22-1 toggles FF 52 and transistor 62 turns off and transistor 65 turns on. The third clock pulse toggles transistor 63 because the state of $\overline{Q}$ of FF 51 and FF 52 and Q of FF 53 coupled to NOR circuits 54 and 55 causes the D input of FF 53 to go high (+). This in turn causes transistor 64 to turn off and transistor 61 to turn on. The fourth clock pulse toggles FF 51 (causes the flip flop to change state) and transistor 53 turns off and transistor 66 turns on. The sixth incoming clock pulse toggles FF 53 and turns transistor 64 and transistor 61 off. This sequence continues and repeats to produce the output sgnal D-1 and D-6 on a repetitive basis as clock pulses are generated and are provided to the Flip Flop 51 to 53.

Figure 7:
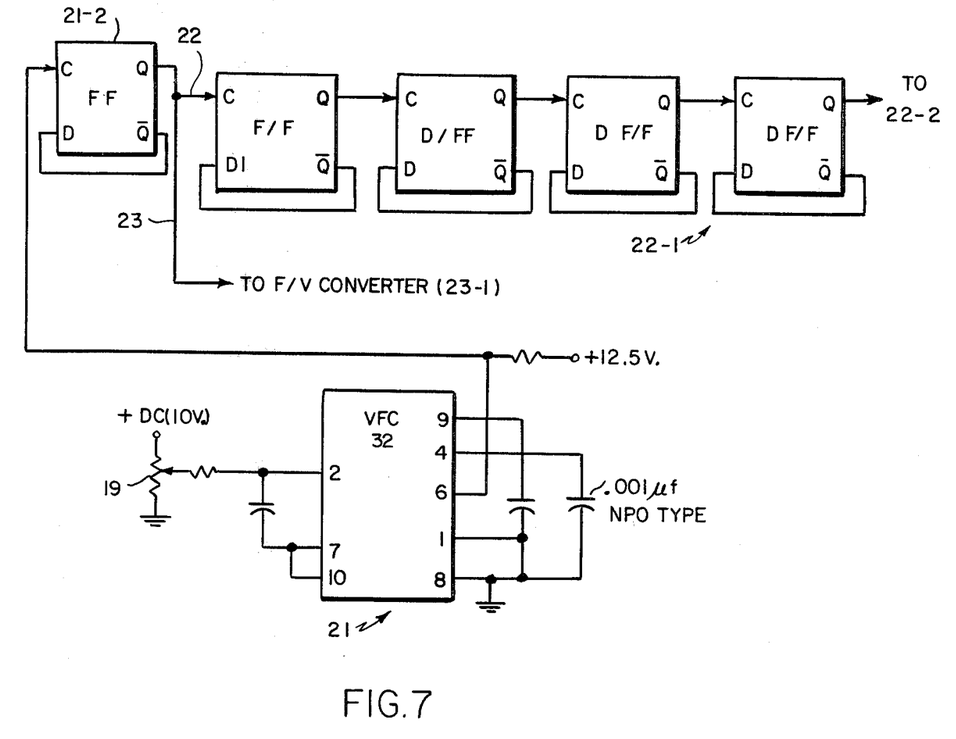
FIG. 7 is a block diagram showing a frequency divider circuit for generating the input signals to the control signal generator 22-2.

FIG. 7 discloses the voltage to frequency converters 21, the divide by two circuit 21-2, and the divide by 16 frequency divider 22-1. The input to the voltage to frequency converter 21 is from the speed pot 19.

It should be understood that a conventional acceleration deceleration control may be interposed between the pot 19 and the converter 21 as is generally known in the art.

The voltage to frequency converter 21 may be a conventional integrated/chip such as a VFC 32 sold by Burr Brown Co. of Tucson, Ariz., which generates up to an 11,520 Hz signal at maximum motor speed and lower frequencies in proportion to the DC voltage from pot 19. This signal is divided by 2 by a D type Flip Flop 21-2, and is provided to both channels 22 and 23. The signal in channel 22 is further frequency divided by a factor of 16 by a frequency divider comprising four Data Flip Flops connected as shown at 22-1 to produce 360 Hz square waves at the maximum motor speed setting of pot 19.

Figure 8:
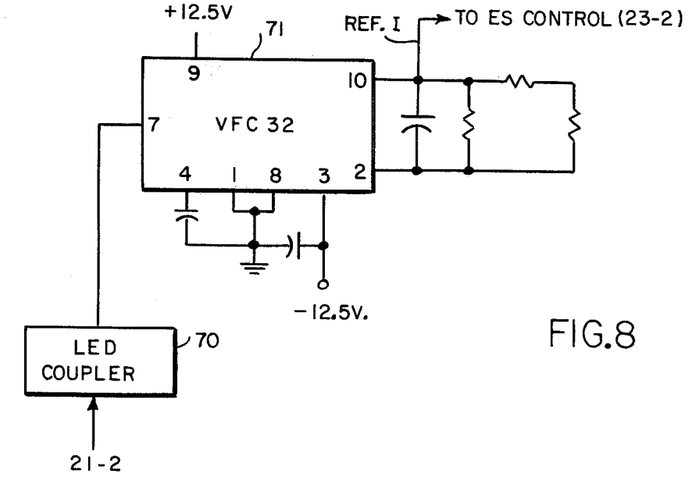
FIG. 8 is a block diagram of a frequency to voltage converter circuit that provides the REF I signal shown in FIG. 1.

FIG. 8 illustrates the F/V converter system 23-1 for coupling to the energy saving control circuit 23-2. The F/V converter system comprises a conventional LED isolator 70 such as shown at 31 in FIG. 3, the output of which is directed to a frequency to voltage converter 71 chip 71 utilizing a Burr Brown VFC-32 chip coupled with the terminals as shown. The voltage output of this circuit ranges between 0 to +10 V DC, and is directed to the ES control circuit 23-2 as shown in FIG. 1.

Figure 10:
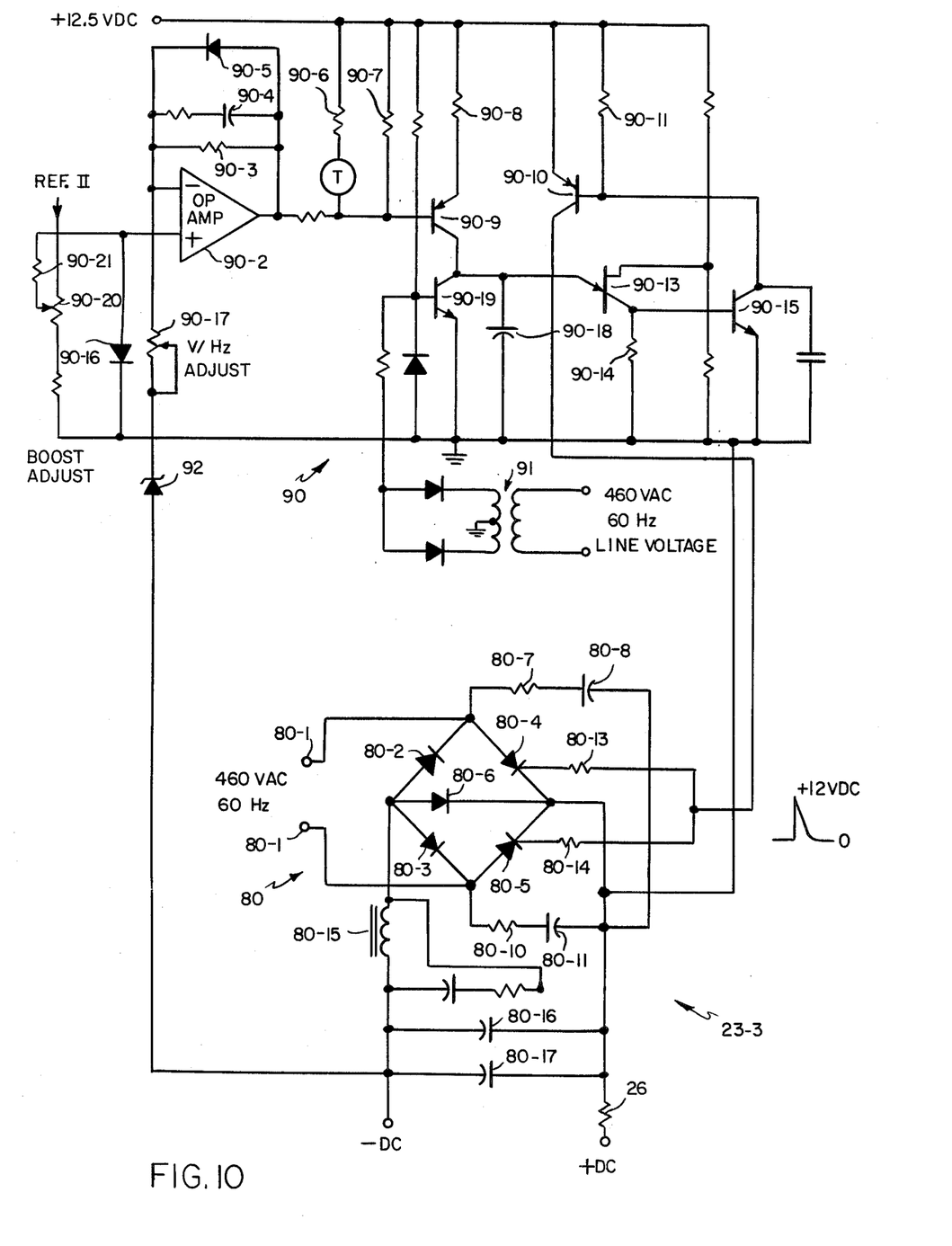
FIG. 10 is a diagram illustrating a circuit for supplying a variable DC voltage to the converter in response to the load current feedback signal, i.e. the magnitude of the sensed current representative of motor load.

Reference should now be had to FIG. 10 which illustrates the controlled DC source 23-3. At 80 there is shown the DC power supply portion, and at 90 there is shown the control portion therefore which is responsive to REF II signal from ES control 23-2.

The power supply portion 80 comprises input terminals 80-1 coupled to a 460V AC source. The AC voltage is applied to a rectifier bridge comprising diodes 80-2 and 80-3 and silicone controlled rectifiers 80-4 and 80-5. A free wheeling diode is shown at 80-6 in order to maintain kickback current through choke 80-15. The magnitude of the DC output voltage provided by this circuit to the motor is controlled in accordance with the phase of SCR firing signals applied from the control circuit portion 90 through current limiting resistors 80-13 and 80-14. The SCR control signals control the time of SCR turn-on during each AC cycle when the SCR is forward biased. The output DC voltage is provided across filter capacitors 80-16 and 80-17 as shown.

Reference should at this time be had to the control circuit portion 90. Assuming that initially the output of the control operational amplifier 90-2 is at 0 volts. The base current of transistor 90-9 is trimmed by resistor 90-7 to provide a constant current to charge the capacitor 90-18. Across capacitor 90-18 is a transistor 90-19 which is turned on for approximately 500 μs each time the line voltage crosses zero. The zero voltage crossover is detected by a zero crossing detector circuit (full wave unfiltered negative power supply) 91 which causes transistor 90-19 to turn on. This causes capacitor 90-18 to discharge and allows a time constant to be set up after each of the zero crossing has passed.

Capacitor 90-18 will charge until the Vp of unijunction transistor 90-13 is reached at which time transistor 91-13 turns on. Transistor 91-13 turning on causes transistor 90-15 to turn on, and the output thereof going low turns on transistor 90-10. When transistor 90-10 turns on, it sends a positive gate pulse to the SCR's 80-4 and 80-5. By increasing the output voltage of op. amp. 90-2 (going more negative) the current through transistor 90-9 increases and causes capacitor 90-18 to charge at a faster rate, causing the SCR's in the DC power portion 80 to fire earlier in each cycle reflecting in an increase in DC output voltage to the motor.

As the value of REF II voltage from the energy saver circuit becomes progressively more positive [output of controller 23-2 as speed control 19 is adjusted to increase operational speed], a more positive voltage is applied to the input of op. amp. 90-2. When diode 90-16 conducts, because REF II has sufficiently increased, operational amplifier 90-2 begins providing a negative output signal which causes the transistor 90-9 to turn on, and institute the generation of SCR control signals.

While the REF II voltage is being increased, a negative feedback voltage via zener diode 92 is summed with the positive REF II voltage and causes the output 90-2 to be less negative.

At the same time resistors 90-20 (boost adjust pot) and resistor 90-21 in conjunction with diode 90-16 act as a boost circuit which allows the motor 25 to generate a greater breakaway torque than normally would be provided below about 600 RPM.

Across operational amp. 90-2 there is provided feedback resistor 90-3, filter capacitor 90-4, and reverse voltage diode 90-5. Resistor 90-6 and thermistor (T) act as a thermal base current offset to transistor 90-9.

Resistor 90-7 acts as a base clamp resistor for transistor 90.9 and resistor 90-8 is an emitter current limiting resistor. Resistor 90-11 is a base clamp resistor for transistor 90-10 and resistor 90-12 limits the base current to transistor 90-10. Pot 90-17 is a volts/Hz adjustment which controls the amount of negative feedback thereby adjusting the ouput voltage at a given frequency.

In operation, as the speed pot 19 [FIG. 1] is adjusted to increase the motor speed, the ES control 23-2 provides a positive voltage REF II speed signal at the output thereof which ultimately controls the voltage produced by the bridge SCR's of 80. As the voltage REF II [speed signal] continues to increase (above 0) the diode 90-16 conducts, which in turn causes operational amplifier 90-2 to operate in an active mode. Prior to diode 90-16 conducting, a positive voltage was present on the + input of 90-2 which forced the output positive, thereby forward biasing diode 90-5 and forcing the output of 90-2 to remain at about +0.6V. The level of the reference voltage REF II which causes diode 90-16 to conduct can be adjusted by pot 90-20 thereby adjusting the amount of offset signal applied to operational amplifier 90-2.

In essence the adjustable pot 90-20 permits an output voltage from operational amplifier 90-2 to be generated earlier than would occur as the speed control 19 is manually adjusted. As the voltage from 90-2 begins going more negative, signals are provided to the SCR's of 80 which create a negative DC voltage. This negative DC voltage is fed back to the input of operational amplifier 90-2 and summed with REF II voltage. The summed voltage in turn regulates the signals to SCR's of 80. If less voltage is provided from ES control 23-3 because of low current in resistor 26 being detected at low motor load, REF II will decrease and produce a decrease in output voltage as the SCR's are caused to fire (turn on) later in the AC cycle when they are forward biased. Conversely at full motor load, the output voltage REF II will be at a maximum and will cause firing earlier in the AC cycle.

I claim:

1. A controlled power supply for an AC motor comprising:
   (a) means for deriving a feedback signal proportional to motor load current;
   (b) means for generating a signal having a characteristic which is proportional to desired motor speed;
   (c) means, connected to said deriving means, for amplifying and integrating said feedback signal;
   (d) a first variable gain amplifier circuit connected to the feedback processing means to receive and amplify the processed feedback signal, and connected to said speed signal generating means in such manner as to render the gain of the amplifier circuit proportional to said characteristic of the speed signal;
   (e) a second variable gain amplifier circuit connected to said speed signal generating means, in parallel to said first amplifier circuit, to receive and amplify said speed signal;
   (f) means connected to said first and second amplifier circuits for summing the signals therefrom and producing a control signal derived from said summed signals;
   (g) means connected to said summing means for supplying a voltage to the motor, said voltage having an amplitude dependent on the magnitude of the control signal; and
   (h) wherein the voltage to the motor is controlled so as to minimize the power applied to the motor over a given range of speeds.

2. The controlled power supply of claim 1 wherein the output voltage from said supply means is proportional to the control signal.

3. The controlled power supply of claim 1 wherein the first variable gain amplifier circuit comprises: an operational amplifier having an output connected to the summing means; and a field effect transistor having a first electrode connected to receive the speed signal, a second electrode connected to receive the processed feedback signal from the feedback processing means, and a third electrode connected to said operational amplifier.

4. The controlled power supply of claims 1 or 3 wherein the second variable gain amplifier circuit comprises: an operational amplifier having an input connected to receive the speed signal and an output connected to the summing means; and a clamping circuit including at least one diode connected between the output and input of the operational amplifier.

5. The controlled power supply of claim 4 wherein the diode is a zener diode.

6. The controlled power supply of claim 1 wherein the speed signal generating means is manually adjustable.

7. The controlled power supply of claim 1 wherein the voltage supply means further includes
   (a) a driver module connectable to an AC motor for generating a controlled AC voltage from a DC input; and
   (b) a controlled DC voltage source including means for rectifying an AC input having an output DC link connected to said driver module to supply the DC input thereto.

8. The controller power supply of claim 1 or 7 wherein the frequency of the signal from the generating means is the characteristic which is proportional to desired motor speed.

9. The controlled power supply of claim 7 wherein the deriving means further includes a resistor connected in the output DC link, said resistor also being connected across the input terminals of an operational amplifier which is included in said amplifying and integrating means.

10. The controlled power supply of claim 1 wherein the first variable gain amplifier circuit effectively multiplies the amplified and integrated feedback signal by the speed signal.

11. A controller for a variable speed AC motor comprising: means for deriving a feedback signal proportional to motor load current; means for generating a signal proportional to desired motor speed; means connected to said feedback means for processing said feedback signal; a variable gain amplifier means connected to the feedback processing means to receive and amplify the processed feedback signal, and connected to said speed signal generating means in such manner as to render its gain dependent on the signal; means connected to said amplifier means and said speed signal generating means for combining the signals therefrom and producing a control signal derived from said combined signals; means connected to said combining means for supplying a voltage to the motor, said voltage having an amplitude dependent upon the combined signal; and whereby the voltage to the motor is controlled so as to reduce the power applied to the motor over a given range of speeds and loads.

* * * * *